US007713123B2

(12) United States Patent
Gerson et al.

(10) Patent No.: US 7,713,123 B2
(45) Date of Patent: May 11, 2010

(54) SLOT MACHINE BONUS GAME

(75) Inventors: Ignacio Gerson, Buenos Aires (AR); Jorge Heymann, Buenos Aires (AR); Mike Park, Lantana, FL (US)

(73) Assignee: ID Interactive LLC, Delray Beach, FL (US)

( * ) Notice: Subject to any disclaimer, the term of this patent is extended or adjusted under 35 U.S.C. 154(b) by 177 days.

(21) Appl. No.: 11/459,253

(22) Filed: Jul. 21, 2006

(65) Prior Publication Data

US 2007/0099687 A1 May 3, 2007

Related U.S. Application Data

(63) Continuation-in-part of application No. 11/337,960, filed on Jan. 23, 2006, now abandoned, and a continuation-in-part of application No. 11/326,125, filed on Jan. 3, 2006, and a continuation-in-part of application No. 11/035,691, filed on Jan. 14, 2005, now Pat. No. 7,393,278.

(60) Provisional application No. 60/597,956, filed on Dec. 27, 2005, provisional application No. 60/766,403, filed on Jan. 17, 2006.

(51) Int. Cl.
*A63F 13/00* (2006.01)

(52) U.S. Cl. .......................... 463/25; 463/16; 273/139; 273/430

(58) Field of Classification Search ..................... 463/1, 463/10–13, 16–21, 23, 25–27, 29–34; 273/138.1, 273/138.2, 139, 141 A, 142 B, 142 C, 142 J, 273/148 R, 429–432; *A63F 13/00*
See application file for complete search history.

(56) References Cited

U.S. PATENT DOCUMENTS

| | | | | | |
|---|---|---|---|---|---|
| 4,836,546 | A | * | 6/1989 | DiRe et al. | 463/18 |
| 6,070,874 | A | * | 6/2000 | Ivers | 273/292 |
| 6,129,632 | A | * | 10/2000 | Luciano | 463/12 |
| 6,186,894 | B1 | * | 2/2001 | Mayeroff | 463/20 |
| 6,193,606 | B1 | * | 2/2001 | Walker et al. | 463/20 |
| 6,390,473 | B1 | * | 5/2002 | Vancura et al. | 273/292 |
| 6,394,899 | B1 | * | 5/2002 | Walker | 463/9 |
| 6,554,283 | B2 | * | 4/2003 | Vancura et al. | 273/292 |
| 6,666,765 | B2 | * | 12/2003 | Vancura | 463/9 |
| 6,752,396 | B2 | * | 6/2004 | Smith | 273/429 |
| 6,780,107 | B2 | * | 8/2004 | Baerlocher et al. | 463/16 |
| 6,863,606 | B1 | * | 3/2005 | Berg et al. | 463/16 |
| 6,938,068 | B1 | * | 8/2005 | Kraft et al. | 709/203 |
| 6,997,805 | B2 | * | 2/2006 | Vancura | 463/20 |

(Continued)

OTHER PUBLICATIONS http://web.archive.org/web/20030624010929/http://www.wheeloffortune.com/.*

(Continued)

*Primary Examiner*—Peter DungBa Vo
*Assistant Examiner*—Arthur O. Hall
(74) *Attorney, Agent, or Firm*—Muskin & Cusick LLC

(57) ABSTRACT

A bonus round for a slot game. A player can select random elements in order to win prizes, different elements may have different award amounts. A player is offered an opportunity to receive a hint, and if the player accepts a hint then the player is provided a clue of which random element(s) to select or avoid to obtain a greater award.

12 Claims, 6 Drawing Sheets

U.S. PATENT DOCUMENTS

| | | | | |
|---|---|---|---|---|
| 7,341,513 | B2 * | 3/2008 | Cuddy et al. | 463/20 |
| 2002/0027323 | A1 * | 3/2002 | Vancura et al. | 273/292 |
| 2002/0043759 | A1 * | 4/2002 | Vancura | 273/139 |
| 2003/0003980 | A1 * | 1/2003 | Moody | 463/16 |
| 2003/0013514 | A1 * | 1/2003 | Cregan et al. | 463/20 |
| 2003/0060281 | A1 * | 3/2003 | Vancura | 463/30 |
| 2004/0036216 | A1 * | 2/2004 | Vancura | 273/274 |
| 2004/0121838 | A1 * | 6/2004 | Hughs-Baird et al. | 463/25 |
| 2005/0033711 | A1 * | 2/2005 | Horvitz et al. | 706/50 |
| 2005/0090307 | A1 * | 4/2005 | Walker et al. | 463/20 |
| 2006/0181028 | A1 * | 8/2006 | Benator | 273/430 |

OTHER PUBLICATIONS

WIKIPEDIA, "Wheel of Fortune," http://en.wikipedia.org/wiki/Wheel_of_Fortune, printed Dec. 8, 2008.

PCT/US2007/074030, Search Report and Opinion, Sep. 26, 2008.

Translated Office Action in Macau Economy Bureau, application No. I/000433(880), Apr. 17, 2009.

* cited by examiner

SLOT MACHINE BONUS GAME

CROSS REFERENCE TO RELATED APPLICATIONS

This application is a continuation in part of application Ser. No. 11/326,125, filed Jan. 3, 2006, which claims benefit of provisional application No. 60/597,956 filed Dec. 27, 2005, both of which are incorporated by reference herein in their entirety. This application is also a continuation in part of application Ser. No. 11/337,960, filed Jan. 23, 2006, now abandoned which claims benefit of provisional application No. 60/766,403, filed Jan. 17, 2006, both of which are incorporated by reference in their entirety. This application is a continuation in part of application Ser. No. 11/035,691, filed Jan. 14, 2005, now U.S. Pat. No. 7,393,278, entitled, "Slot Machine Game That Allows Player to Purchase Reel Respins," which is incorporated by reference herein in its entirety.

BACKGROUND OF THE INVENTION

1. Field of the Invention

The present invention is directed to an interactive bonus round for a slot machine game which allows a player to receive hints in order to win greater awards.

2. Description of the Related Art

Bonus rounds are portions of games implemented by slot machines which allow players to earn greater awards. Various types of bonus rounds are implemented in order to provide for greater entertainment value for the player.

SUMMARY OF THE INVENTION

It is an aspect of the present invention to provide a wagering game which can be exciting to players.

The above aspects can be obtained by a method that includes (a) offering a player an opportunity to select a particular element from at least two selectable elements, with a winning element out of the at least two selectable elements resulting in a preferred award to the player; (b) offering a player an option to receive a hint on which of the at least two selectable elements is the winning element and displaying a monetary cost for the hint; and (c) accepting the hint, by the player, wherein a non-winning element out of the at least two selectable elements is eliminated from consideration and the cost for the hint is deducted from the player's credit meter.

The above aspects can also be obtained by a method that includes (a) offering a player an opportunity to select a particular element from at least two selectable elements, with a winning element out of the at least two selectable elements resulting in a preferred award to the player; (b) offering a player an option to receive a hint on which of the at least two selectable elements is the winning element and displaying a monetary cost for the hint; and (c) accepting the hint, by the player, wherein a non-winning element out of the at least two selectable elements is eliminated from consideration and the preferred award is reduced.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
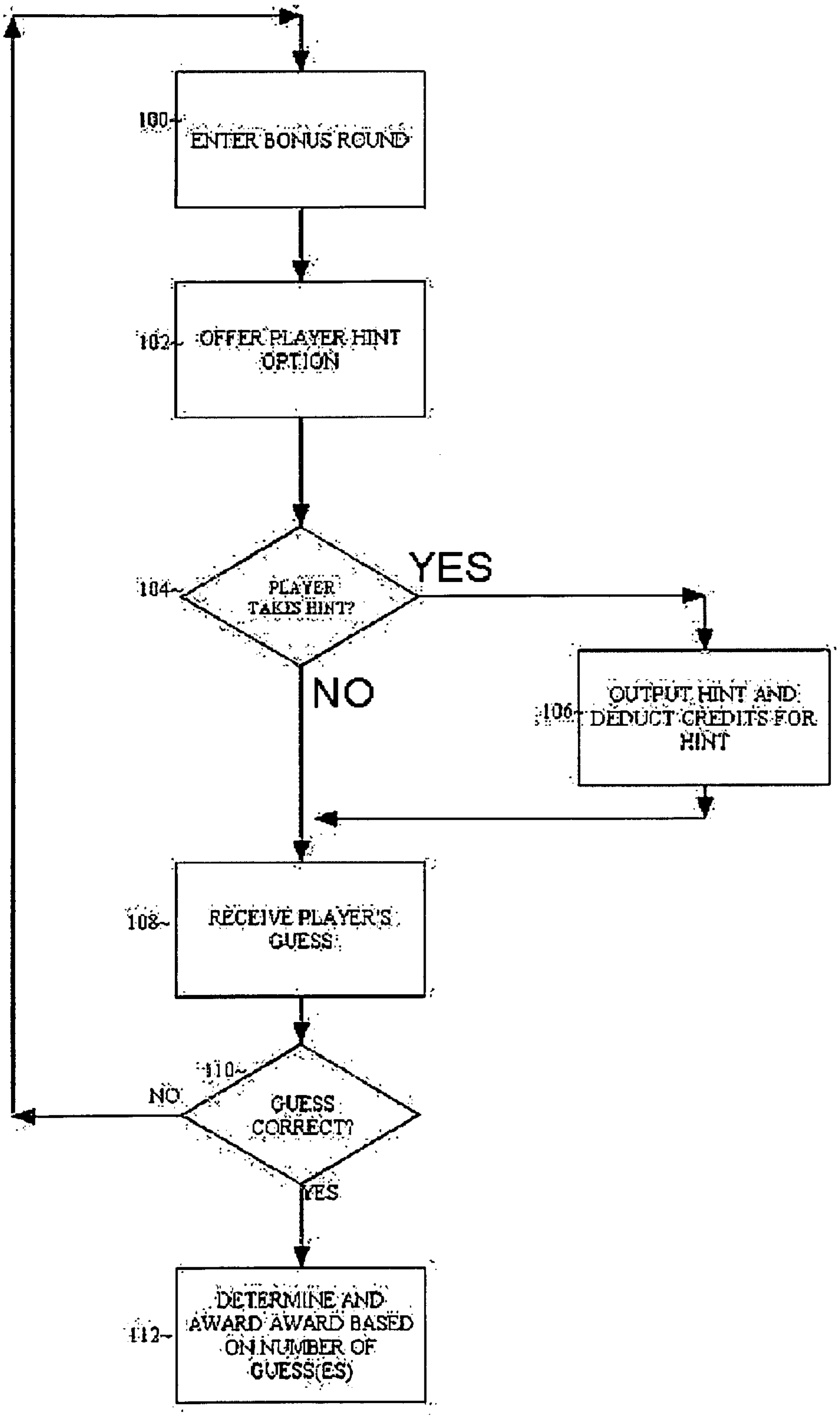
FIG. 1 is a flowchart illustrating an exemplary method of purchasing a hint during a bonus round, according to an embodiment.

Reference will now be made in detail to the presently preferred embodiments of the invention, examples of which are illustrated in the accompanying drawings, wherein like reference numerals refer to like elements throughout.

The present general inventive concept relates to a method, system, and computer readable storage to implement a bonus round for a wagering game. The bonus round gives the player a choice of elements in order to uncover a prize(s). A hint can be offered during the bonus game which can help the player find where the prize is or otherwise help the player to make a more informed decision than if the hint was not provided. In exchange for receiving the hint, the player can pay a monetary amount, receive a reduced award, or another method of compensating the house for providing the hint to the player.

A hint can be information given to the player in order to improve the player's performance in a bonus round, the bonus round allowing the player to select element(s), the selected element(s) each of which have variable consequences for the player. For example, if the player is shown three boxes, each box with a hidden prize behind it, a hint can comprise, for example: telling the player which box has the smallest prize; telling the player which box has the largest prize; eliminating the box that has the smallest prize; eliminating any box which does not have the largest prize; telling the player that the larger prize is in two out of the three boxes, or any other information that can be used by the player to his or her benefit.

A further example of hints and bonus rounds can be as follows. The bonus round can allow the player to choose a first element out of a first set of elements (and possibly a second element out of the second set of elements as well, such as illustrated in the Ser. No. 11/035,691 patent application), wherein if the player makes his or her choices properly (which match the winning machine chosen predetermined element(s)) an award (or a greater award) can be awarded. A hint can tell the player a clue about which element(s) is the winning element. For example, if the player is to pick a particular person, a hint can be, "the person is a male," "the person is wearing blue," "the person is not a dwarf," etc. A hint can be a clue that can tell a player which element(s) should be eliminated from their choice.

FIG. 1 is a flowchart illustrating an exemplary method of purchasing a hint during a bonus round, according to an embodiment.

Figure 3A:
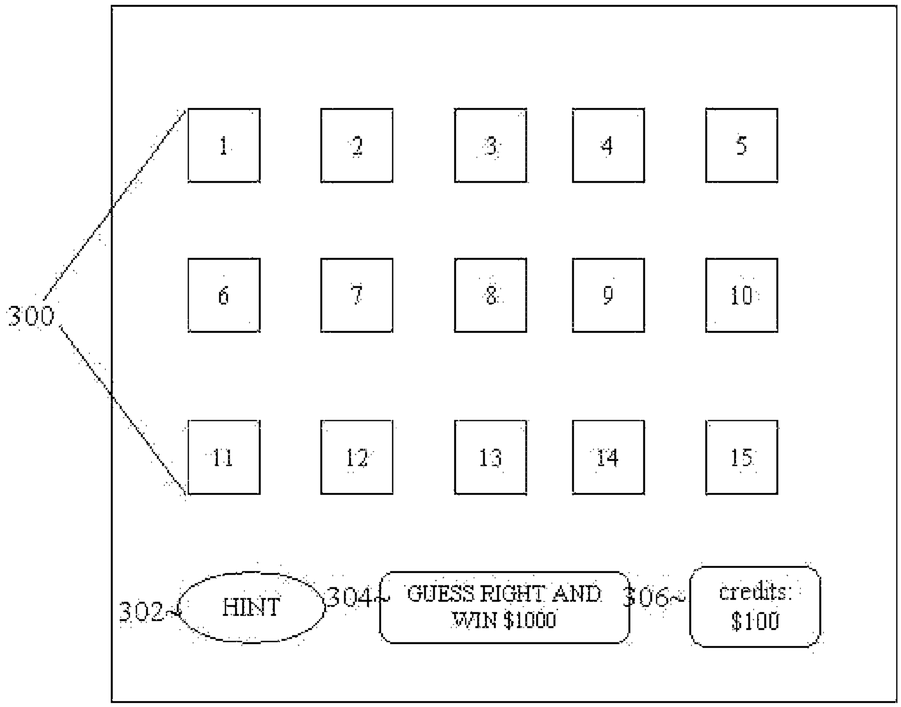
FIG. 3A is an exemplary output of a bonus game allowing purchasing of hints in a first state, according to an embodiment.

The method can start with operation 100, wherein the player enters the bonus round. This can be done as known in the art, such as by receiving certain combination(s) on a reeled slot game which triggers the bonus round. This also displays the bonus round to the player. Typically, the bonus round presents the player with a choice of icons to select, and depending on the selection, the player can win, receive nothing, or even lose credits. FIG. 3A illustrates an example of such a bonus round.

From operation 100, the method can proceed to operation 102, which offers the player a hint option. A player can choose to receive a hint for example by pressing a button. The player may not be required to take a hint if he or she does not want one.

From operation 102, the method proceeds to operation 104 which determines whether the player has selected to take a hint. If the player presses a button (or otherwise indicates he or she wishes to take a hint) then the method proceeds to operation 106, which displays a hint to a player and the player can be charged to receive the hint. The charge can come out of the player's credit meter (balance) on the machine, or the player can insert money to pay for the hint, or any other manner to compensate the house for allowing the player to receive the hint. The hint can come in many forms, for example an output stating, "the prize is not in box 9" or alternatively eliminating box 9 from the display (so that the player cannot select box 9).

From either operation 104 or 106, the method can then proceed to operation 108, which receives the player's guess. The player can enter his guess by touching an icon on the screen (or any other method such as pressing buttons on the machine). If incorrect, the icon the player has selected can disappear (or can be otherwise disabled or removed from consideration) so that the player will not be able to select it again. Of course, the more elements that have been disabled or removed from consideration, the greater the chances the player will guess correctly. Removing an item from consideration can be done in numerous ways, such as making the item invisible, leaving it visible but no longer selectable by the player, or any other method wherein this item cannot be selected by the player when the player is given an opportunity to select items. Giving a hint that a particular item should not be selected, but allowing the player to nevertheless select this wrong element if the player wishes to play foolishly, can also be considered to remove this item from consideration.

From operation 108, the method can proceed to operation 110, which determines whether the guess is correct. If the guess is not correct, then the method can return to operation 100 which would continue the bonus round. Alternatively the method can return to standard slot game (non bonus round), whereupon when the bonus round is triggered again, then the bonus round continues from where it left off. Note that in an embodiment, a finite number of guesses may be offered to the player before the bonus game resets and starts anew with a full set of initial selectable elements.

It is noted that when the method returns to operation 100, this can take different forms, depending on the game being implemented. For example, the method can return to the bonus round so the player can immediately can take another guess (and possibly select to receive another hint as well). Alternatively, in a "continuous" bonus round scheme (such as that described in the Ser. No. 11/035,691 document), the player would have to earn his way (e.g. trigger a particular combination) back into the bonus round (returning to operation 100) to take another guess.

If the determination in operation 110 determines that the player's guess was correct, then the method can proceed to operation 112, which determines an award based on the number of guesses used. Typically, the more guesses used, the smaller an award should be expected.

Figure 2:
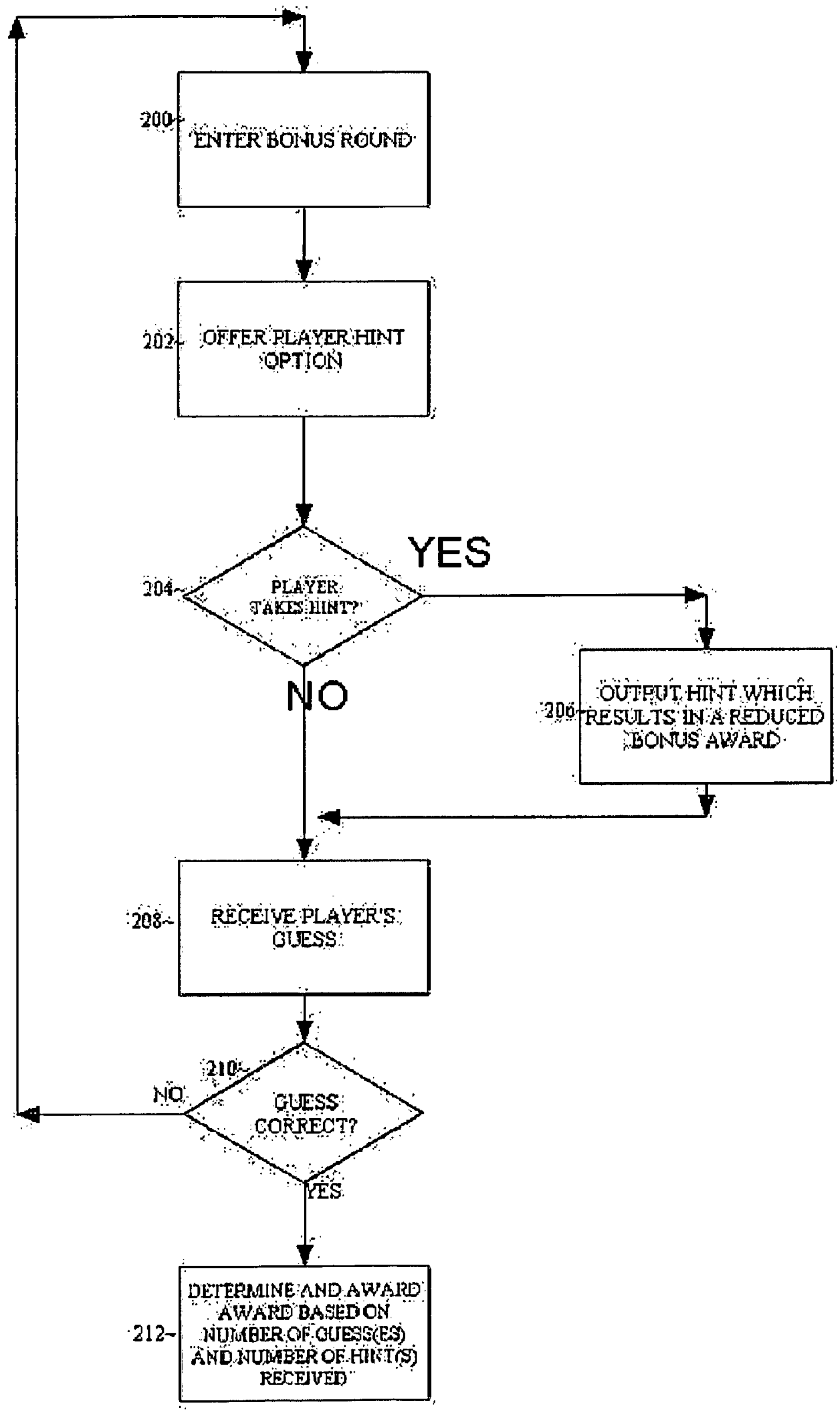
FIG. 2 is a flowchart illustrating an exemplary method of reducing a potential award in exchange for a hint, according to an embodiment.

The operations in FIG. 2 (see operations 200, 202, 204, 208, 210) are similar to their counterpart in FIG. 1 although note that operations 206 and 212 are different. In operation 206, when a hint is output, this has a result of a reduced bonus award if and when the player wins a bonus award. The bonus award may be reduced during operation 206, or it can be reduced at a later time as long as the method keeps track of how many hints were awarded (so the bonus award reduction can properly reflect the number of hints).

In operation 212, the bonus award is awarded based on the number of guesses the player has taken to pick the proper element as well as the number of hints the player has received.

It is noted that, as an optional element, at any time during the method a player may reset the bonus round. This player can do this by, for example, pressing a particular button on the unit. The machine would then pick entirely new winning elements (or otherwise reallocate prizes etc.) and the award for guessing correctly (and also consolation prizes) are reset to initial or new values. This would typically be done by a new player. If a previous player has viewed hints in exchange for a reduced award, a new player may not have access to the hints but will nevertheless be penalized by receiving reduced award(s). Thus, a new player can reset the bonus round to avoid this issue. A non-new player can also do this at his or her option as well.

Figure 3B:
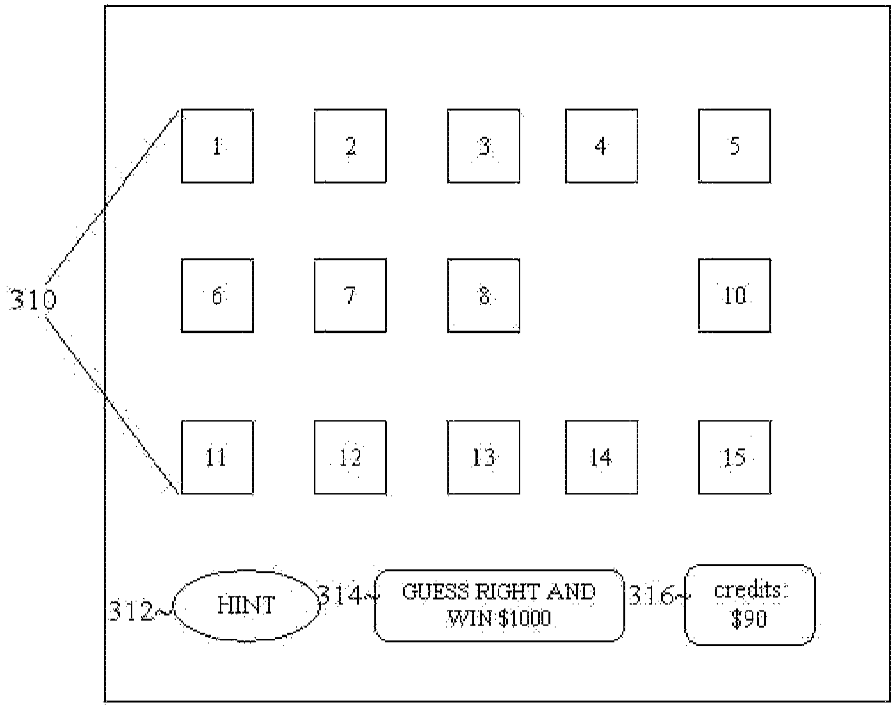
FIG. 3B is an exemplary output of a bonus game allowing purchasing of hints in a second state, according to an embodiment.

FIG. 3A is an exemplary output of a bonus game in a first state, according to an embodiment. FIGS. 3A-3B illustrate an example of the method illustrated in FIG. 1.

Selectable elements 300 are numbered from 1 to 15 (although of course any number of such elements can be used). A player can touch any of the elements in order to reveal a prize "behind" the respective element. A prize can be, for example, an amount of dollars won, nothing, or even an amount of dollars lost (deducted from the current bonus round win or credit meter). In an embodiment, a prize can be hidden behind one of the selectable elements and it is the player's goal to pick which selectable element contains the prize. If the player picks right, he wins a main prize. If he picks wrong, then the player does not win anything (or wins a consolation prize) and the amount of the main prize decreases.

A credit meter 306 displays an amount of credits the player currently owns. A hint button 302, when pressed, allows the player to receive a hint. A win output meter 304 displays the main prize if the player is to touch the correct selectable element (e.g. the player wins $1000 in this case if the player guesses correct).

In this example, the player has pressed the hint button 302, and then the state changes to what is illustrated in FIG. 3B.

FIG. 3B is an exemplary output of a bonus game in a second state, according to an embodiment.

Since the hint button 302 or 312 was pressed, the player receives a hint. The hint can come in many forms, such as removing one (or more) of the "wrong" selectable elements (one which will not award the main prize), or advising the player which element(s) are "wrong" or "right." In this case, selectable element number 9 has been removed. In order to accommodate the player receiving a hint, the player has paid $10 (or any amount) for the hint, noted by the credit meter 316 which reflects that the player now has $90 (as opposed to the previous $100 before the player has pressed the hint button). The win output meter 314 still reflects that the main prize is $1,000.

A player may now continue the bonus round, wherein he or she can press any of the selectable elements (except of course number 9 which can no longer be selected) and attempt to win the main prize. The player may also choose to press the hint button, upon which he or she is presented with another hint (e.g. another selectable element being removed) for a cost. While not pictured, the cost of each hint should typically be displayed so that the player knows how much receiving a hint will cost. The cost of a hint may be constant, e.g., $10 per hint, or it may be variable depending on the instant circumstances (e.g. how many hints have already been received, number of selectable elements left, etc.).

Note that the cost for a hint can be determined in any manner, such as using a list or table as one example. For example, Table I illustrates a list of sequential costs for a hint. For example, in Table I, the first hint would cost $10, the second hint would cost $10, the third hint would cost $12, the fourth hint would cost $13, and the fifth hint would cost $18. In an embodiment, a finite number of hints can be offered, and after this amount of hints offered, no further hints are available.

TABLE I

| |
|---|
| $10, $10, $12, $13, $18 |

In a further method of determining hint costs, a list can be used of hint costs based on a number of remaining elements. In Table II, if the player takes a hint with 5 elements, the hint would cost $10. If 4 elements are left, a hint would cost $13, etc. In this game, the number of initial selectable elements can be 5 (or any other number). Note that if a hint is offered with only 2 elements left (such a hint may or may not be offered depending on the embodiment), the player would be guaranteed to win the main prize since after the hint there will be only one selectable element left.

TABLE II

| Elements left | hint cost |
|---|---|
| 5 | $10 |
| 4 | $13 |
| 3 | $30 |
| 2 | $50 |

Figure 4A:
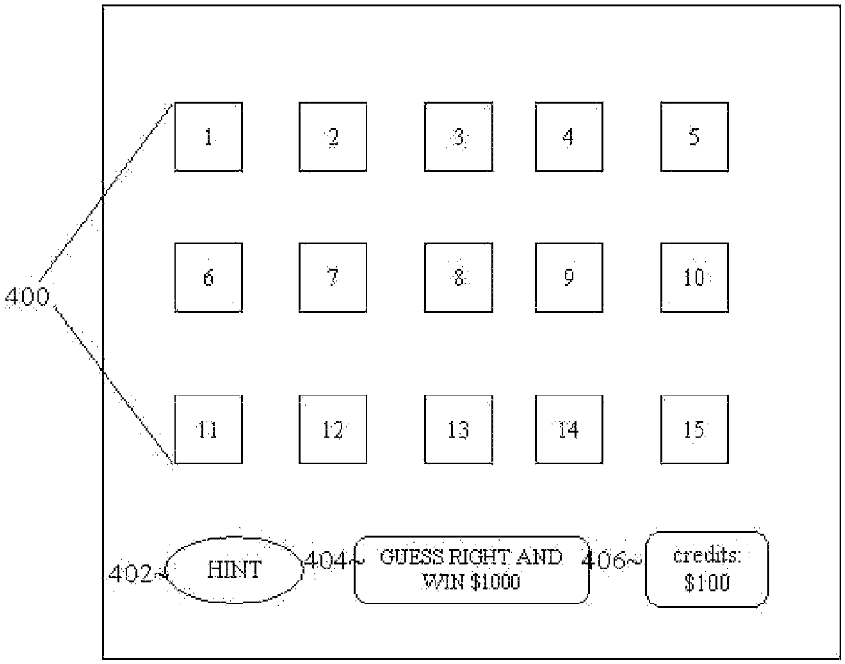
FIG. 4A is an exemplary output of a bonus game allowing reduction of a bonus amount in a first state, according to an embodiment.
Figure 4B:
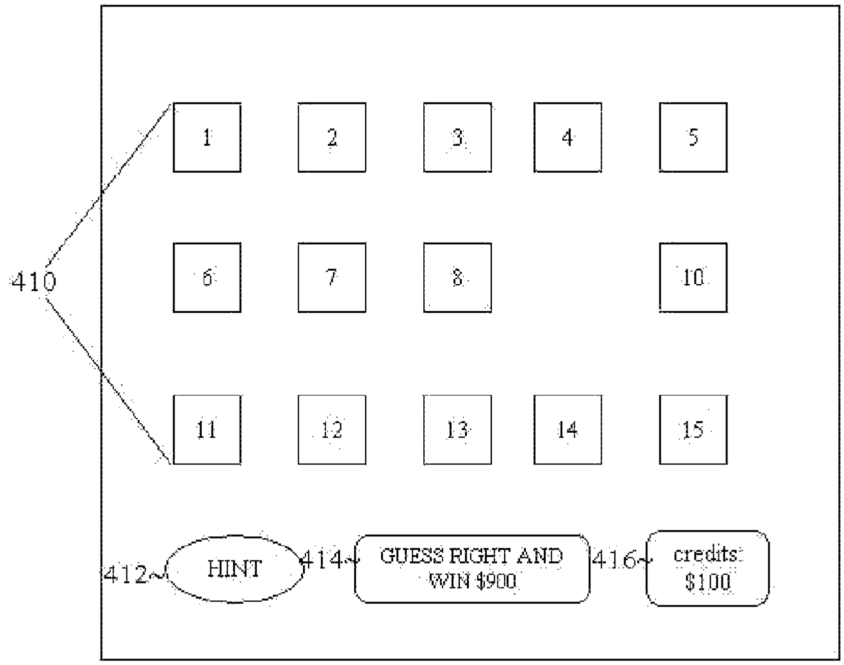
FIG. 4B is an exemplary output of a bonus game allowing reduction of a bonus amount in a second state, according to an embodiment.

FIG. 4A is an exemplary output of a bonus game allowing reduction of a bonus amount in a first state, according to an embodiment. FIGS. 4A-4B illustrate an example of the method illustrated in FIG. 2.

As in FIGS. 3A-3B, selectable elements 400 are displayed which can be selected (typically touched on a touch screen) by a player. A hint button 402 allows the player to request a hint. A win output meter 404 shows how much the main prize is in the bonus round. A credit meter 406 shows how much money the current player has.

A player presses the hint button 402, which causes the game to proceed to a second state, illustrated in FIG. 4B.

FIG. 4B is an exemplary output of a bonus game allowing reduction of a bonus amount in a second state, according to an embodiment.

Note that the player has received a hint, which in this example, is the elimination of selectable element number 9 in the selectable elements 410. The credit meter 416 shows that the player still has $100 in credits. However, the win output meter 404 shows that the main prize is now $900. This is because the player has received a hint, and the game accommodates the player advantage of receiving the hint by reducing the amount of the main prize. A player may wish to do this if the player wishes have a better chance at winning the main prize, even at the expense of a reduced prize. Note that a hint can come in other forms as well which can include a group (instead of an individual element), such as "the winning element is odd," "the winning element is not even," "you would be advised to pick an odd," etc. A hint can also inform the player of a group that would have a highest expected value to the player, for instance if box A had a hidden $2; and box B had a hidden $1; and box C had a hidden $2; a hint may come in the form of, "you would be advised to pick a box with a vowel," since the 'A' box has a higher average ($2) than the non-vowel boxes ($1.5). This hint can also be phrased, "you would be advised not to select a consonant."

Note that the prize value can be determined in any number of ways, for example using a table of selectable elements left and a bonus amount. Table III illustrates an example of a table of selectable elements remaining and how much the main award is reduced if a hint is offered. For example, if the main award is $100, and there are 5 selectable elements left, and the player takes a hint, then the main award would be reduced by 10% resulting in a main award of $90. The examples presented herein are used for exemplary purposes only. In reality, in this example, the player would be wise to take the hint since he now has a (1/4) chance of winning $90 or an expected value of $22.50. Without the hint, the player would have a (1/5) chance of winning $200, or an expected value of $20. Of course, the reduction amounts can be adjusted such that the player can also come out behind by taking the hint, or the reductions amounts can be adjusted such that the player can come out even (e.g. taking a hint does not help or hurt the player).

TABLE III

| Selectable elements left | hint reduction amount |
|---|---|
| 5 | 10% |
| 4 | 15% |
| 3 | 25% |
| 2 | 50% |

It is noted that hints can come in many forms. For example, instead of eliminating elements as a hint, a clue can be given as to which element(s) is correct without eliminating any elements.

Figure 5A:
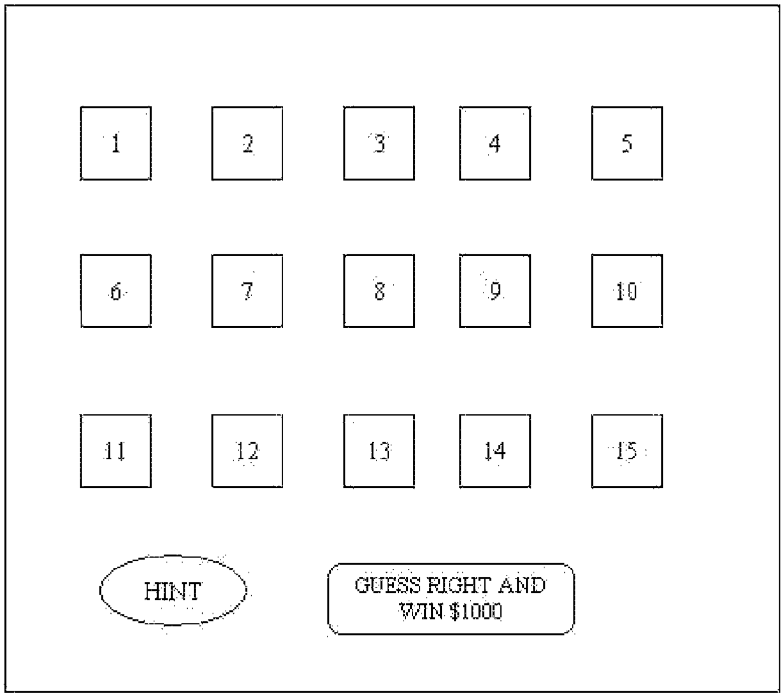
FIG. 5A is an exemplary output of a bonus game providing hints in a first state, according to an embodiment.

FIG. 5A is an exemplary output of a bonus game providing hints in a first state, according to an embodiment.

Figure 5B:
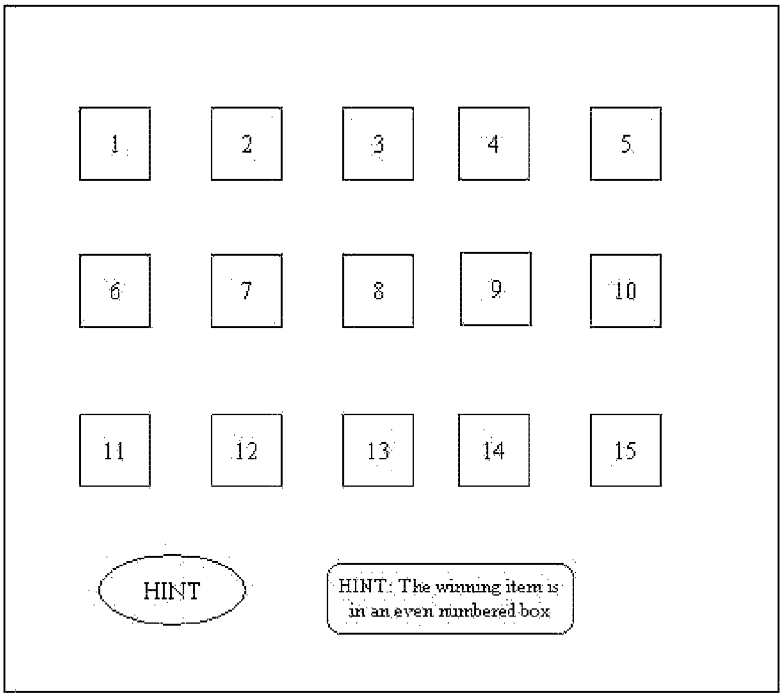
FIG. 5B is an exemplary output of a bonus game allowing purchasing of hints in a second state, according to an embodiment.

FIG. 5B is an exemplary output of a bonus game allowing purchasing of hints in a second state, according to an embodiment. Different prizes can be in different boxes, and of course the player wishes to select a box with the highest prize in it. Note that a hint is provided to the player which states, "HINT: The winning item is in an even numbered box." Thus, the player should not select an odd numbered box (although if the player plays foolishly he or she still can). This type of hint can be applied to any of the embodiments described herein.

Note that a bonus game may require a player to select more than one proper element (e.g. one element out of a first set and another element out of a second set) to win a maximum award. Hints described herein can apply to such a structure as well and to any other variation in which a player makes a random selection in order to receive a preferred award.

In a further embodiment, a hint can be won. For example, if the player receives a particular combination on the main slot game (e.g. 7/7/7/7/7) then the player can win a hint (e.g. "in the bonus round, the weapon is not black."), or a credit to collect a free hint during the bonus round. The game math can factor in the expected value of this hint to the player. For example, if such a hint is worth $5 to the player, then instead of winning $5 on that line (with the hint award combination) the player receives hint. Of course, this hint is only valuable to the player once the player reaches the bonus round.

Figure 6:
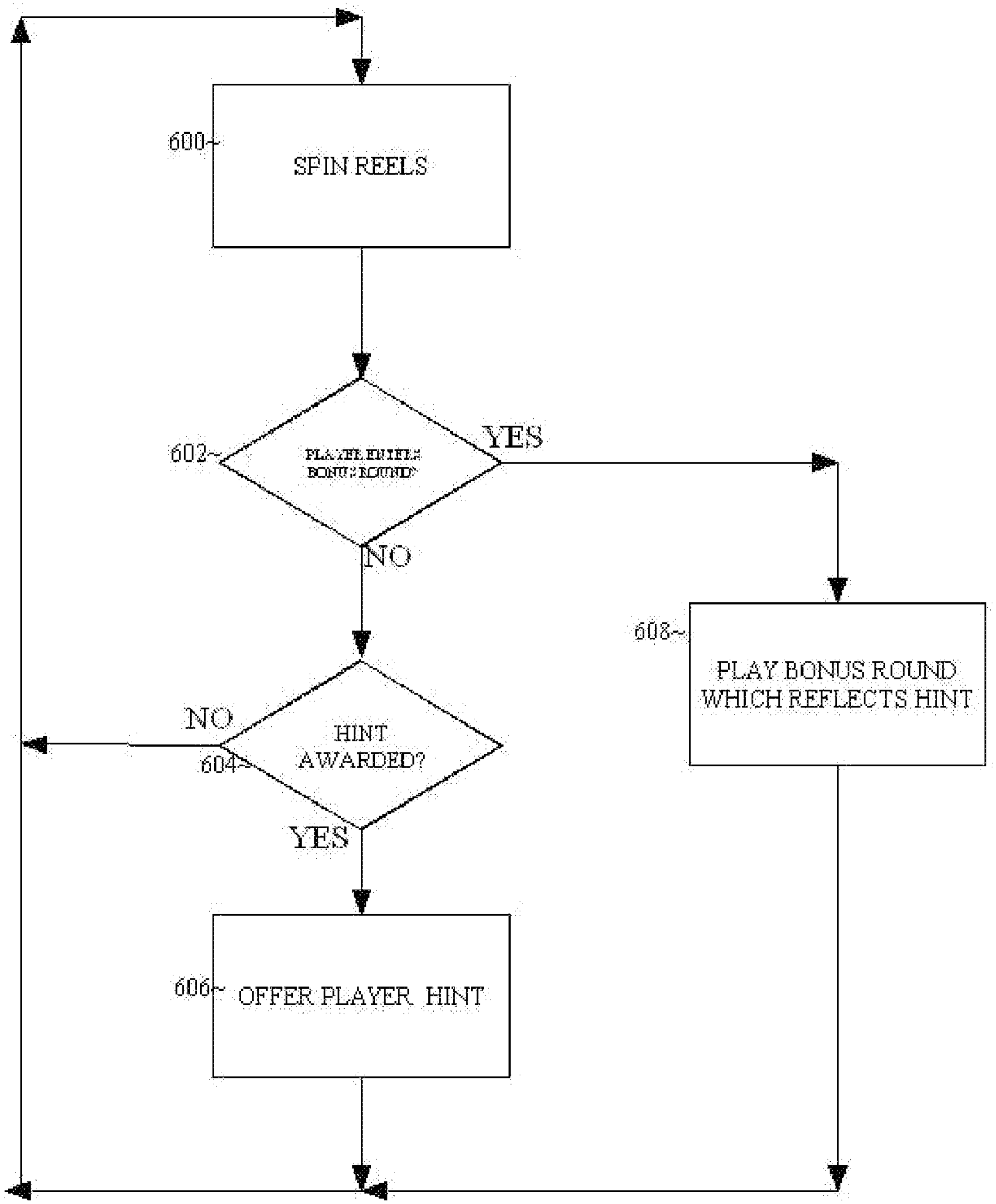
FIG. 6 is a flowchart illustrating an exemplary method to allow a player to win a bonus round hint, according to an embodiment.

FIG. 6 is a flowchart illustrating an exemplary method to allow a player to win a bonus round hint, according to an embodiment.

The method can start with operation 600, which spins the reels on the main game.

From operation 600, the method can proceed to operation 602, which determines if the player enters the bonus round. This can be done as known in the art, for example of the resultant reel combination has a predetermined combination of symbols.

If the determination in operation 602 determines that the player has entered the bonus round, then the method can proceed to operation 608, which plays the bonus round which reflects any hint(s) given to the player (from operation 606). If no hints were awarded to the player then the bonus round is played wherein the player has no hints to help his or her actions. After the bonus round is played in operation 608, the method can proceed to operation 600 which begins a new game. The bonus round in operation 608 can be a standard bonus round in which once it ends, new winning (or preferred) elements are selected for the next bonus round, or the bonus round in operation 608 can be a continuous bonus round, in which the pre-selected elements by the machine (e.g. the winning elements) remain constant until the player has won the bonus round, upon which the bonus round then resets.

If the determination in operation 602 determines that the player has not entered the bonus round, then the method can proceed to operation 604, which determines if a hint is to be awarded. A hint can be awarded if any or some active paylines comprise a particular combination which triggers a hint (e.g. 5 (or any number of) "hint" symbols).

If the determination in operation 604 determines that a hint is to be awarded, then the method can proceed to operation 606 which offers the player a hint or a credit to collect a free hint during the bonus round. A credit to collect a free hint during the bonus round can then allow the player, once the player has entered the bonus round, to automatically (or upon pressing a button) receive a hint free of charge. The hint can come in any form known or described herein (e.g. elements can be eliminated from selection on the bonus round or a hint can be given about which element(s) the player should or shouldn't choose).

The math can work as follows. If an award is worth $11.11 (according to a predetermined paytable calculated as known in the art), then the monetary award can be instead replaced with a hint worth $11.11. If the expected value of a bonus round is $100 (e.g., there are 10 boxes to select and only one box has a $1000 award), and with a hint (an elimination of one wrong box out of the 10) the expected value of the bonus round is now worth $111.11 (a 1/9 chance of winning $1000). Thus, mathematically, the getting the hint is equivalent to receiving the corresponding monetary award, although of course the hint can be worth more or less than its monetary equivalent. This math also assumes the player will reach the bonus round, which of course may not always be the case.

From operation 606 or 608, the method can return to operation 600, in which the main game can be played again and thus the reels can be spun anew.

It is noted that any of the operations described herein can be performed in any sensible order. Further, any operations may be optional. Also, any feature or embodiment described herein can be combined with any other.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a bonus wagering game, the method comprising:

performing the following on a slot machine:

receiving a wager from a player at the slot machine;

offering the player an opportunity to select a particular element from at least two selectable elements, wherein a winning element out of the at least two selectable elements results in a highest award to the player;

offering the player an option at the slot machine to receive a hint on which one of the at least two selectable elements is the winning element;

displaying a monetary cost for the hint on the slot machine, the monetary cost to reduce a credit meter of the player;

accepting the hint, by the player using the slot machine, wherein in response to the hint being accepted by the player, a non-winning element out of the at least two selectable elements is identified and the monetary cost for the hint is deducted from the credit meter of the player, wherein the monetary cost for the hint increases as a number of potential winning selectable elements out of the at least two selectable elements decreases; and awarding a bonus award to the player on the slot machine.

2. A method as recited in claim 1, wherein based on the monetary cost for hint, accepting the hint puts the player at no mathematical advantage or disadvantage.

3. A method as recited in claim 1, further comprising:

receiving a guess of one of the selectable elements from the player; and when the guess is the non-winning element, then the method immediately returns to the offering the player an opportunity.

4. A method as recited in claim 1, further comprising:

receiving a guess of one of the selectable elements from the player; and when the guess is the non-winning element, then the method returns to a main slot game which can randomly trigger entry to the bonus wagering game which can then resume the bonus wagering game.

5. A method as recited in claim 1, wherein the hint eliminates at least one of the selectable elements.

6. A method as recited in claim 1, wherein the hint provides information to the player as to which of the selectable elements should be selected to maximize an award.

7. A method to play a bonus wagering game, the method comprising:

performing the following on a slot machine:

receiving a wager from a player at the slot machine;

offering the player an opportunity to select a particular element from at least two selectable elements, wherein a winning element out of the at least two selectable elements results in a highest award to the player;

offering the player an option at the slot machine to receive a hint on which one of the at least two selectable elements is the winning element;

accepting the hint, by the player using the slot machine, wherein in response to the hint being accepted by the player, a non-winning element out of the at least two selectable elements is identified and the highest award is reduced by a monetary cost that does not reduce a credit meter of the player, wherein the monetary cost increases as a number of potential winning selectable elements out of the at least two selectable elements decreases; and awarding a bonus award to the player on the slot machine.

8. A method as recited in claim 7, wherein based on the monetary cost for hint, accepting the hint puts the player at no mathematical advantage or disadvantage.

9. A method as recited in claim 7, further comprising:

receiving a guess of one of the selectable elements from the player; and when the guess is the non-winning element, then the method immediately returns to the offering the player an opportunity.

10. A method as recited in claim 7, further comprising:

receiving a guess of one of the selectable elements from the player; and when the guess is the non-winning element, then the method returns to a main slot game which can randomly trigger entry to the bonus wagering game which can then resume the bonus wagering game.

11. A method as recited in claim 7, wherein the hint eliminates at least one of the selectable elements.

12. A method as recited in claim 7, wherein the hint provides information to the player as to which of the selectable elements should be selected to maximize an award.

* * * * *